United States Patent
Clinick et al.

(10) Patent No.: US 8,965,950 B2
(45) Date of Patent: Feb. 24, 2015

(54) DECOUPLED MECHANISM FOR MANAGED COPY CLIENT APPLICATIONS AND E-COMMERCE SERVERS TO INTEROPERATE IN A HETEROGENEOUS ENVIRONMENT

(75) Inventors: Andrew John Clinick, Issaquah, WA (US); John Carl Simmons, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 1734 days.

(21) Appl. No.: 11/764,767

(22) Filed: Jun. 18, 2007

(65) Prior Publication Data

US 2008/0313270 A1    Dec. 18, 2008

(51) Int. Cl.
*G06F 15/16*    (2006.01)
*G06F 9/445*    (2006.01)
*H04L 29/08*    (2006.01)
*G06F 21/10*    (2013.01)
*G06Q 20/12*    (2012.01)

(52) U.S. Cl.
CPC .......... *H04L 67/1095* (2013.01); *G06F 21/10* (2013.01); *G06F 8/61* (2013.01); *H04L 67/02* (2013.01); *G06Q 20/1235* (2013.01)
USPC .......................... 709/203; 717/178

(58) Field of Classification Search
CPC ............ G06F 21/10–21/16; G06F 8/60–8/68; G06Q 20/123–20/1235; H04N 21/2541; H04L 2209/60–2209/608; H04L 2463/101; H04L 2463/103; H04L 67/02; H04L 10/1097
USPC .............. 726/26–33; 709/201–203, 217–219, 709/225, 229; 713/193; 705/51–59; 380/201–204; 717/174–178
See application file for complete search history.

(56) References Cited

U.S. PATENT DOCUMENTS

| | | | |
|---|---|---|---|
| 5,958,008 A * | 9/1999 | Pogrebisky et al. .......... | 709/223 |
| 5,995,756 A * | 11/1999 | Herrmann ...................... | 717/178 |
| 6,327,594 B1 | 12/2001 | Van Huben et al. | |
| 6,345,239 B1 | 2/2002 | Bowman-Amuah | |
| 6,523,027 B1 | 2/2003 | Underwood | |

(Continued)

FOREIGN PATENT DOCUMENTS

WO    WO 2006090974 A1 *    8/2006

OTHER PUBLICATIONS

"Advanced Access Content System (AACS): Industry Briefing," 11 pp. (document dated Jul. 14, 2004).

(Continued)

*Primary Examiner* — Patrice Winder
*Assistant Examiner* — Julian Chang
(74) *Attorney, Agent, or Firm* — Micah Goldsmith; Judy Yee; Micky Minhas

(57) ABSTRACT

Request data is generated at a client device having at least one managed copy client application. The request data includes an identifier (e.g., a uniform resource locator, class ID, etc.) for an integration control (e.g., an ActiveX control, Java applet, etc.) installable on the client device. The request data is transmitted and, in response to the request data, response data (e.g., an object element in an HTML page) is received from a server (e.g., an e-commerce server). The response data facilitates installation of the integration control on the client device, and the integration control provides an interface to facilitate communication between the server and the managed copy client application.

18 Claims, 6 Drawing Sheets

(56) References Cited

U.S. PATENT DOCUMENTS

| | | | |
|---|---|---|---|
| 6,718,535 B1 | 4/2004 | Underwood | |
| 6,757,709 B1 | 6/2004 | Oberdorfer | |
| 7,035,918 B1* | 4/2006 | Redding et al. | 709/223 |
| 7,062,453 B1 | 6/2006 | Clarke | |
| 7,069,234 B1 | 6/2006 | Cornelius et al. | |
| 8,543,785 B2 | 9/2013 | Clinick et al. | |
| 2002/0108050 A1* | 8/2002 | Raley et al. | 713/193 |
| 2002/0161996 A1* | 10/2002 | Koved et al. | 713/150 |
| 2002/0187778 A1* | 12/2002 | Jacobs et al. | 455/419 |
| 2004/0015958 A1* | 1/2004 | Veil et al. | 717/174 |
| 2005/0044541 A1* | 2/2005 | Parthasarathy et al. | 717/173 |
| 2005/0086326 A1* | 4/2005 | Manning et al. | 709/219 |
| 2005/0086501 A1* | 4/2005 | Woo et al. | 713/189 |
| 2005/0091511 A1* | 4/2005 | Nave et al. | 713/185 |
| 2005/0137984 A1* | 6/2005 | Nguyen et al. | 705/51 |
| 2005/0278793 A1* | 12/2005 | Raley et al. | 726/28 |
| 2006/0059561 A1* | 3/2006 | Ronning et al. | 726/26 |
| 2006/0117107 A1* | 6/2006 | Shafron et al. | 709/227 |
| 2006/0200865 A1 | 9/2006 | Leake et al. | |
| 2006/0259544 A1* | 11/2006 | Zubenko et al. | 709/203 |
| 2008/0005802 A1* | 1/2008 | Fierstein et al. | 726/27 |
| 2008/0028170 A1* | 1/2008 | Clinick et al. | 711/162 |
| 2008/0046884 A1* | 2/2008 | Shin et al. | 717/177 |
| 2008/0060083 A1* | 3/2008 | Koved et al. | 726/27 |
| 2010/0153492 A1* | 6/2010 | Brunswig et al. | 709/203 |
| 2011/0247077 A1* | 10/2011 | Nguyen et al. | 726/26 |
| 2012/0260353 A1* | 10/2012 | Raley et al. | 726/29 |

OTHER PUBLICATIONS

"Advanced Access Content System (AACS): Technical Overview (informative)," 32 pp. (document dated Jul. 21, 2004).

"Advanced Access Content System (AACS): Pre-recorded Video Book," Revision 0.91, 61 pp. (document dated Feb. 17, 2006).

Carey et al., "Heterogeneous Tools for Heterogeneous Network Management with WBEM," 7 pp. (undated document).

Cluts, "DHTML? Applets? Controls? Which to Use?" *Microsoft Yech Net*, 7 pp. (document dated Feb. 13, 1998) [downloaded from the World Wide Web on Apr. 24, 2007].

Perenson, "Burning Questions: No Copying From First High-Def Players," *PC World*, 3 pp. (document dated Mar. 21, 2006) [downloaded from the World Wide Web on Apr. 23, 2007].

Poncelon et al., "Enabling Secure Distribution of Digital Media to SD-Cards," *MM '06*, Santa Barbara, California, pp. 495-496 (Oct. 2006).

W3C, "Objects, Images and Applets in HTML documents," 23 pp. [downloaded from the World Wide Web on Apr. 23, 2007].

W3C, "HTML 4.01 Specification," 11 pp. (document dated Dec. 24, 1999) [downloaded from the World Wide Web on Aug. 28, 2007].

* cited by examiner

Software 180 implementing described managed copy techniques and tools

Figure 3

```xml
<?xml version="1.0"?>
<offers xmlns:xsi="http://www.w3.org/2001/XMLSchema-instance"
render="http://www.wb.com/hp/mc/HP.aca" version="1.23"
xsi:noNamespaceSchemaLocation="http://www.aacs.org/schemas/
offers.xsd">
    <offer>
        <title>Harry Potter I</title>
        <link>http://www.wb.com/hp/mc</link>
        <abstract>A short piece about a wizard</abstract>
        <description>A long piece about a wizard</description>
        <image>
            <url>http://www.wb.com/hp/mc/mainimage.png</url>
            <title>Harry Potter Image</title>
        </image>
        <language>en-us</language>
        <mcot>something useful about mcot here</mcot>
        <availability end="1/12/2006" start="4/12/2005"></availability>
        <price>$1</price>
    </offer>
    <offer>
        <title>Harry Potter I and II</title>
        <link>http://www.wb.com/hpII/mc</link>
        <abstract>A short piece about a wizard</abstract>
        <description>A long piece about a wizard</description>
        <image>
            <url>http://www.wb.com/hpII/mc/mainimage.png</url>
            <title>Harry Potter II Image</title>
        </image>
        <language>en-us</language>
        <mcot>something useful about mcot here</mcot>
        <availability end="1/12/2006" start="4/12/2005"></availability>
        <price>$1</price>
    </offer>
</offers>
```

```
<permission xmlns:xsi="http://www.w3.org/2001/XMLSchema-
instance" xsi:noNamespaceSchemaLocation="http://www.aacs.org/
schemas/permission.xsd">
    <status>true</status>
    <MCScert>B64BINARY</MCScert>
    <mcotInfo>string</mcotInfo>
    <dealManifest>string</dealManifest>
    <signature>B64BINARY</signature>
</permission>
```

US 8,965,950 B2

DECOUPLED MECHANISM FOR MANAGED COPY CLIENT APPLICATIONS AND E-COMMERCE SERVERS TO INTEROPERATE IN A HETEROGENEOUS ENVIRONMENT

BACKGROUND

A "managed copy" of digital media typically refers to a copy of a digital media product (e.g., video content on a video disc such as an HD-DVD or Blu-ray high-definition video disc, an electronic book, etc.) that can be made by or provided to the owner of the digital media product for limited use. For example, a purchaser of a video disc may wish to have a digital backup copy of the video content in case of theft or accidental loss. As another example, a purchaser may wish to view the purchased video content on a portable device that does not play video discs.

A good managed copy system will allow users of digital media content to acquire managed copies while protecting against piracy and other unauthorized copying. For example, a provider of a managed copy service can use encryption keys to facilitate controlled access to managed copies of digital media. A managed copy system may also provide additional ways for content providers to monetize media content. For example, a managed copy service may provide a way for a user to obtain managed copies of content on a purchased video disc for an additional fee.

To allow digital media content providers, managed copy service providers, and digital media users to enjoy the benefits of managed copies, it is desirable to make managed copies available for different kinds of devices and to allow managed copy services to work on different platforms.

SUMMARY

In summary, the Detailed Description is directed to various techniques and tools for implementing managed copy operations. For example, described techniques and tools involve a mechanism to allow client devices to communicate with managed copy servers and e-commerce servers while reducing possible barriers or inefficiencies in the communication.

In one aspect, managed copy request data is generated at a client device having at least one managed copy client application. The request data includes an identifier (e.g., a uniform resource locator, class ID, etc.) for an integration control (e.g., an ActiveX control, Java applet, etc.) installable on the client device. The managed copy request data is transmitted and, in response to the request data, response data (e.g., an object element in a HyperText Markup Language ("HTML") page) is received from a server (e.g., an e-commerce server). The response data facilitates installation of the integration control on the client device, and the integration control provides an interface to facilitate communication between the server and the managed copy client application. The integration control can include a method to be called when a transaction on the server has been completed. The request data also may include a type indicator (e.g., Java, ActiveX, etc.) for the integration control. The integration control can be installed on the client device, and managed copy information can be received from the server via the integration control. One or more managed copies of a digital media products can be made based at least in part on the managed copy information received from the server via the integration control.

In another aspect, managed copy request data is received at a server. The managed copy request data includes an identifier for a managed copy client application integration control installable on a client device. The managed copy client application integration control is located (e.g., on the server that received the request data or on some other server) based at least in part on the identifier. Response data is transmitted in response to the received managed copy request data. The response data facilitates installation of the managed copy client application integration control on the client device. The managed copy client application integration control provides an interface to facilitate communication between a server and a managed copy client application running on the client device. The identifier can include a uniform resource locator, and the managed copy client application integration control can be located (e.g., by an e-commerce server) by looking up the managed copy client application integration control at a location specified by the uniform resource locator. The response data can include an object element in an HTML page. The HTML page can include script that calls one or more methods of the managed copy client application integration control.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

BRIEF DESCRIPTION OF THE DRAWINGS

FIG. 3 is a code diagram showing example offer data in the form of XML schema.

DETAILED DESCRIPTION

Described embodiments are directed to techniques and tools for implementing managed copy processes. For example, described techniques and tools involve a mechanism to allow client devices to communicate with managed copy servers and e-commerce servers while reducing possible barriers or inefficiencies in the communication.

The various techniques and tools described herein may be used independently. Some of the techniques and tools may be used in combination (e.g., in different components of a managed copy system and/or different stages of a managed copy process).

Various techniques are described below with reference to flowcharts of processing acts. The various processing acts shown in the flowcharts may be consolidated into fewer acts or separated into more acts. For the sake of simplicity, the relation of acts shown in a particular flowchart to acts described elsewhere is often not shown. In many cases, the acts in a flowchart can be reordered.

I. Computing Environment

Figure 1:
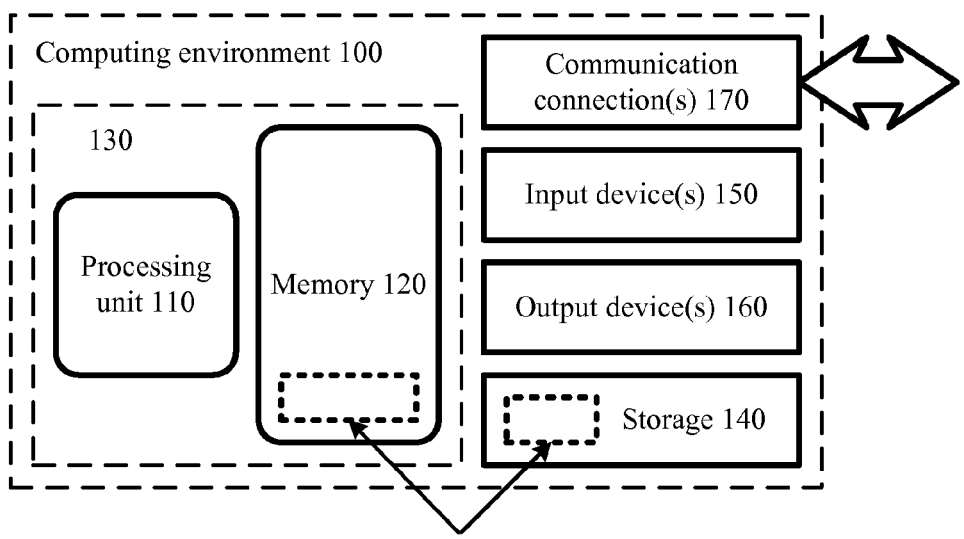
FIG. 1 is a block diagram of a suitable computing environment in conjunction with which several described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing one or more of the described managed copy techniques and tools.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, flash memory, or any other medium which can be used to store information and which can be accessed within the computing environment (100). The storage (140) stores instructions for the software (180).

The input device(s) (150) may be a touch input device such as a keyboard, mouse, pen, touch screen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM, CD-RW or DVD that reads audio or video samples into the computing environment (100). The output device(s) (160) may be a display, printer, speaker, CD- or DVD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on one or more target real processors or virtual processors. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "request" and "choose" to describe computer operations in a computing environment. Unless specified as user actions, these terms are high-level abstractions for operations performed by a computer, and should not be confused with acts performed by a human being. The actual computer operations corresponding to these terms vary depending on implementation.

II. Techniques and Tools for Interoperation of Managed Copy Client Applications with Managed Copy Servers and E-Commerce Servers Described embodiments implement one or more techniques and tools for implementing managed copy processes. Described techniques and tools include, for example, mechanisms to allow different managed copy client applications (sometimes referred to as managed copy "machines") to perform managed copy operations and communicate with servers using a standardized interface. The standardized interface allows servers without working knowledge of (or decoupled from) specific managed copy client applications on a client device to nevertheless provide appropriate information to a managed copy client application on a client device to allow managed copy operations to take place. Described techniques and tools can be used in a managed copy system designed according to the Advanced Access Content System ("AACS") standard.

In described examples, a client device communicates with an e-commerce server used for facilitating electronic commercial transactions relating to managed copies and with a managed copy server that provides information used for choosing from available managed copy offers and for making managed copies. However, described embodiments can be used with servers that are not limited to e-commerce functions or managed copy functions.

A. Managed Copy Offers and Permissions

In described implementations, managed copy processes use a client-server protocol that allows a client to request and receive managed copy offer information from a server, and to request and receive permission to make managed copies from the same server or a different server. Examples of possible offers include an offer to allow a user to store a backup copy of a digital media product on a hard drive, or an offer to allow a user to store a copy on a portable media player.

This section describes mechanisms for client devices (e.g., personal computers, digital media players, cellular phones with media player capabilities, or other electronic devices) to communicate with servers (e.g., e-commerce servers, managed copy servers) in a managed copy context. Described embodiments can be used with the example mechanisms described in this section, or with other mechanisms.

Figure 2:
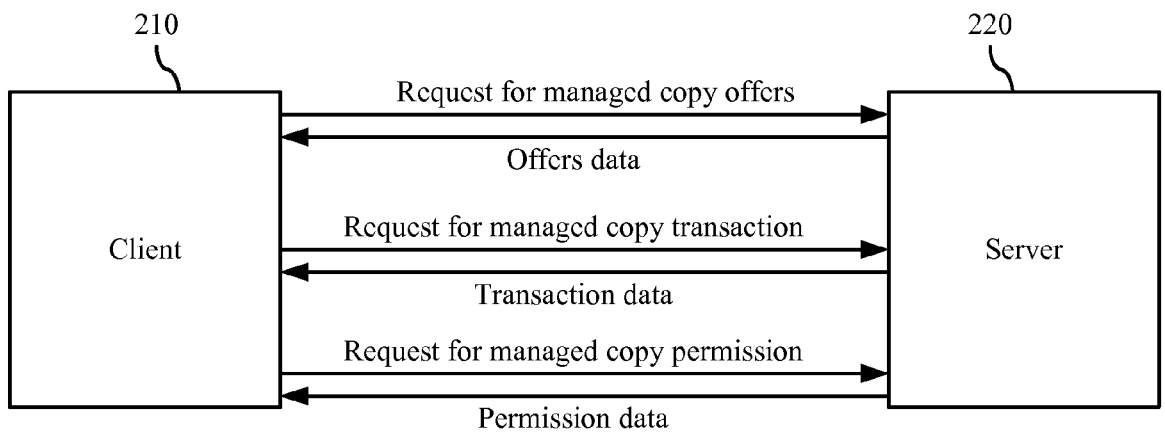
FIG. 2 is a block diagram of a generalized client-server relationship and information flow in a managed copy context.

FIG. 2 is a block diagram of a generalized client-server relationship and information flow in a managed copy context. In the example shown in FIG. 2, a request for managed copy offers originates at a client device (210) and a server (220) responds to the request. For example, a response to a request for managed copy offers includes data in the form of Extensible Markup Language ("XML") schema. This XML offers data can be referred to as offers XML or offers schema. The offers schema allows the client to interpret the offers data being returned in response to the request for offers, irrespective of the operating system of the server. FIG. 3 is a code diagram showing sample XML data (300) returned from a server in response to a request for offers in one implementation. The data (300) provides information relating to the available offers. For example, the data (300) includes an offer for "Harry Potter I" and an offer for "Harry Potter I and II" with images and descriptions, effective dates, and pricing information associated with each offer. Alternatively, offers data can be presented using hypertext markup language ("HTML") or some other language or data format.

Offers data can be presented to a client device such that the form factor and capabilities of the client device are taken into account. For example, a client device can choose a display format that suits the capabilities (e.g., user interface and display capabilities) of the client device. To allow functionality for different kinds of client devices, the offers schema can associate rendering applications with the offers data, if desired, to help different client devices render the data. For example, rendering applications can be specified in offers schema for a relevant device such as an HD-DVD or Blu-ray video disc player in the form of a uniform resource identifier ("URI") associated with the rendering application. A managed copy client application running on a client device also can provide a user interface for a user to choose managed copy offer they are interested in.

If a user chooses an offer, the managed copy client application can then communicate with an e-commerce server to facilitate a transaction. Referring again to FIG. 2, a client (210) requests a managed copy e-commerce transaction from the server (220), and the server (220) provides managed copy transaction data to the client (210) in response to the request. In the example shown in FIG. 2, the client (210) requests managed copy offer data and requests a managed copy e-commerce transaction from the same server (220). However, in some implementations, these functions are performed by different servers (e.g., managed copy servers and e-commerce servers, respectively).

For example, an e-commerce server handles a commercial transaction by accepting transaction information (e.g., payment information) from a user, processing the transaction information provided by the user and returning an authorization at the completion of the transaction. When a user has completed a managed copy commercial transaction, authorization data is sent to the client device proving that the commercial transaction is complete. Authorization data can be provided by the e-commerce server that was used during the transaction, or by some other source.

When authorization data has been received by the client device, the client device can then send a request for permission to the managed copy server. Referring again to FIG. 2, a client (210) sends a request for permission to make one or more managed copies to the server (220), and the server (220) provides managed copy permission data to the client (210) in response to the request. In the example shown in FIG. 2, the client (210) sends a request for permission and requests a managed copy e-commerce transaction from the same server (220). However, in some implementations, these functions are performed by different servers.

Figure 4:
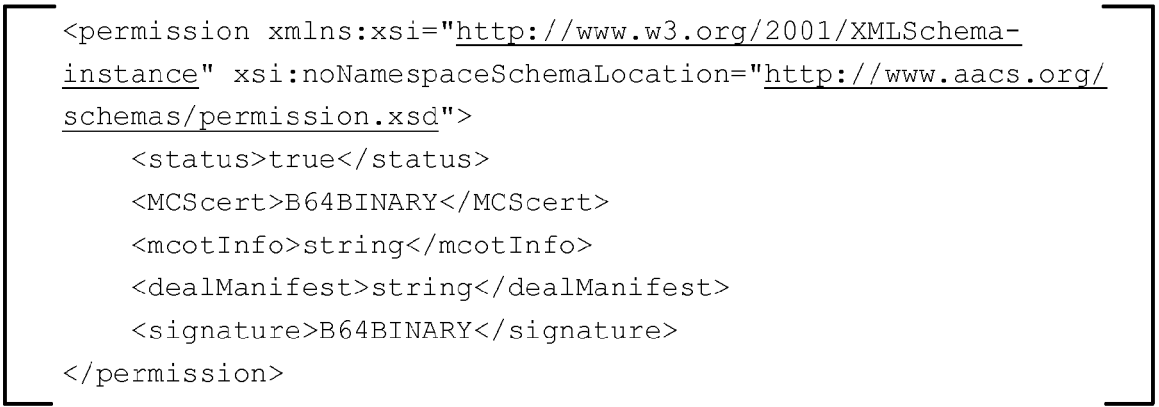
FIG. 4 is a code diagram showing example permission data in the form of XML schema.

The request for permission can include, for example, identifying information for the managed copy and/or the video content to be copied, such as content ID ("CID"), pre-recorded media serial number ("PMSN") and/or managed copy output ID ("MCOT ID"). The request for permission also may include other information, such as authorization data or security information. The permission data is returned in the form of XML "permission schema." The permission schema provides information that allows a copy of the media content to be made and stored (e.g., at the client device or some other device). FIG. 4 is a code diagram showing example permission data (400) in the form of XML permission schema. Alternatively, permission data can be presented using HTML or some other language or data format.

B. Managed Copy Client Application Integration Control

Managed copy processes often involve communication between an e-commerce server typically and a client device. For example, a client device establishes a communication link with an e-commerce server, which in turns provides an HTML page that allows a user to enter information to allow the transaction to take place (e.g., credit card information, product information, security information, etc.).

HTML pages can pose challenges for managed copy transactions. For example, HTML browsers on client devices are typically "sandboxed," meaning that script in HTML pages on servers cannot directly access resources or applications outside the browser on a client device. Although this can be beneficial for security purposes, it affects a server's ability to communicate directly with a managed copy client application on the client device.

To facilitate communications between servers and managed copy client applications on client devices, a described managed copy client application integration control implements a standardized interface. For example, managed copy client application integration controls can be implemented as ActiveX controls or Java applets. (ActiveX is a control mechanism developed by Microsoft Corporation for use on many platforms, such as the Microsoft Windows family of operating systems. Java applets also can be used on many platforms.) In this heterogeneous environment, the standardized interface allows managed copy client applications provided by third-party software vendors to communicate with a server without the server having working knowledge of the managed copy client applications.

Figure 5:
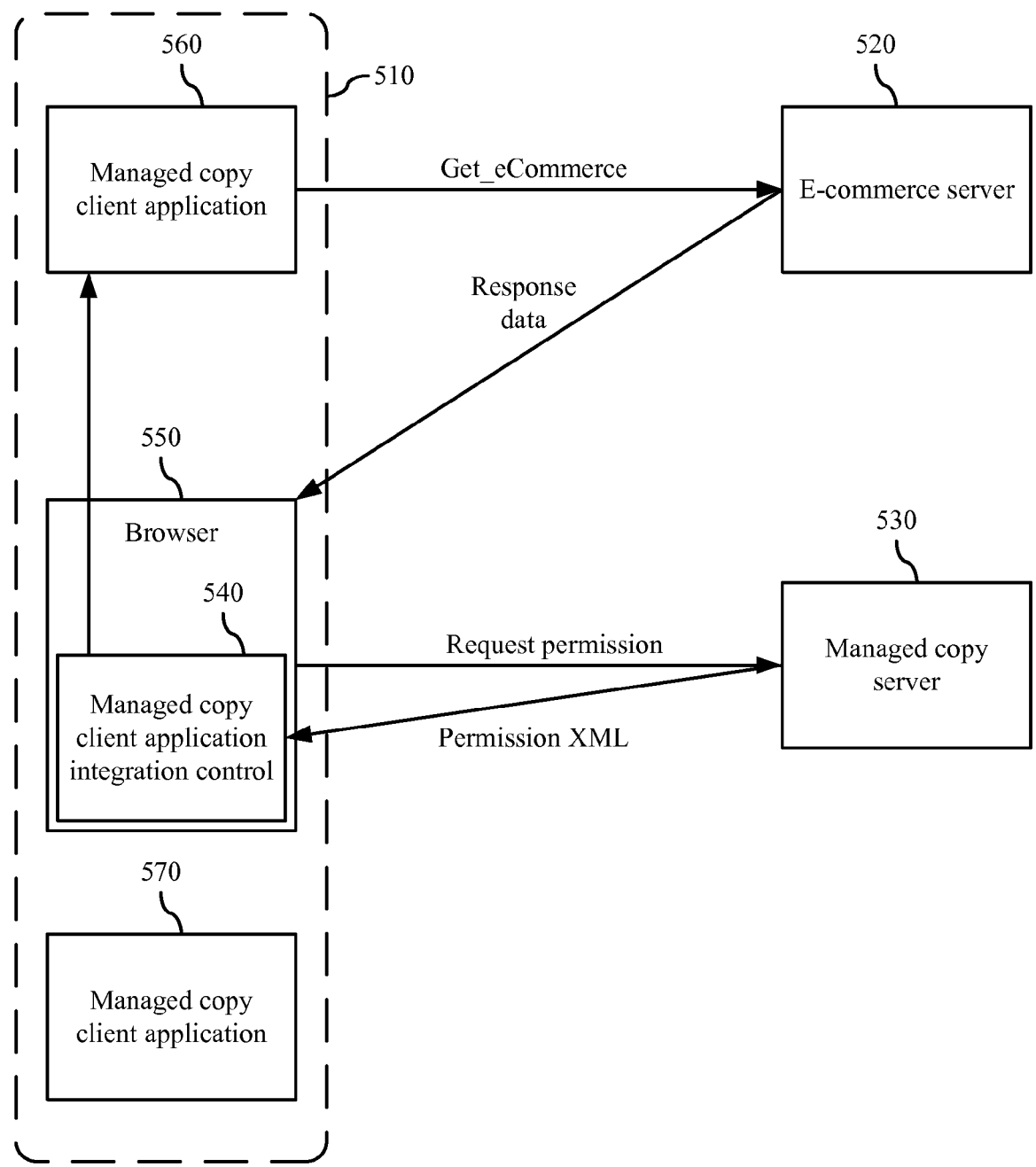
FIG. 5 is a block diagram showing a client device, an e-commerce server, a managed copy server and information flow in a managed copy context according to described embodiments.

FIG. 5 is a diagram showing information flow relating to a managed copy process in which a managed copy client application integration control (540) is used. In the example shown in FIG. 5, the managed copy client application integration control (540) is implemented in the browser (550) running on a client device (510). Information is exchanged between the client device (510) and two servers: an e-commerce server (520) and a managed copy server (530). The managed copy client application integration control (540) provides an interface that supports communication between the e-commerce server (520) and a managed copy client application (560) on the client device (510).

As shown in FIG. 5, the managed copy client application (560) sends a request for a transaction (get_eCommerce) to the e-commerce server (520), and the e-commerce server (520) sends an HTML page to the client device (510) that can be viewed with the browser (550). For example, the HTML page provided by the e-commerce server (520) defines a user interface that allows the user to enter information that is relevant to the transaction (e.g., payment information and product information). The HTML page also includes a reference to an object that corresponds to the managed copy client application integration control (540). Using the reference to the object, the client device obtains the managed copy client application integration control (540) to facilitate communication between the managed copy client application (560) and the servers (520, 530).

For example, the managed copy client application integration control (540) communicates with a script in an HTML page on the e-commerce server (520). In one implementation, an interface provided by the control (540) includes a method, CompleteTransaction, which can be called by a script within an HTML page when a user has completed a transaction on the e-commerce server (520). When the CompleteTransaction method is called, relevant information is passed to the managed copy client application (560), and the managed copy client application (560) starts a managed copy permission process. If an HTML window has been opened during the managed copy process, when the HTML interface is no longer needed a script can be used to close the HTML window.

In one implementation, a script in the HTML page can access XML offers schema that was provided in response to a request from the managed copy client application to the managed copy server. To facilitate this, the control (540) provides a property called "offers" which returns a string representation of the offers XML.

Techniques and tools for selecting the managed copy client application integration control (540) are described below.

C. Selecting a Managed Copy Client Application Integration Control

This section describes techniques and tools for selecting a managed copy client application integration control. Described techniques and tools allow selection from among several available integration controls. For example, for a client device with multiple implementations of a managed copy client application, it can be important to be able to select an appropriate control for the managed copy client application that will be communicating with a server.

For example, a unique identifier for the control/applet is provided to ensure that a managed copy client application integration control appropriate for a managed copy client application that is communicating with an e-commerce server. To accomplish this, in one implementation a managed copy client application sends a request to an e-commerce server that includes:

a) a string (e.g., a ClassId or uniform resource locator ("URL")) to identify the control to be used; and
b) a type of control (e.g., ActiveX, Java, etc.).

When the e-commerce server receives a request from a managed copy client application, the e-commerce server can create an HTML page to send to the client device that includes an integration control specified by the identifying string and type.

Figure 6:
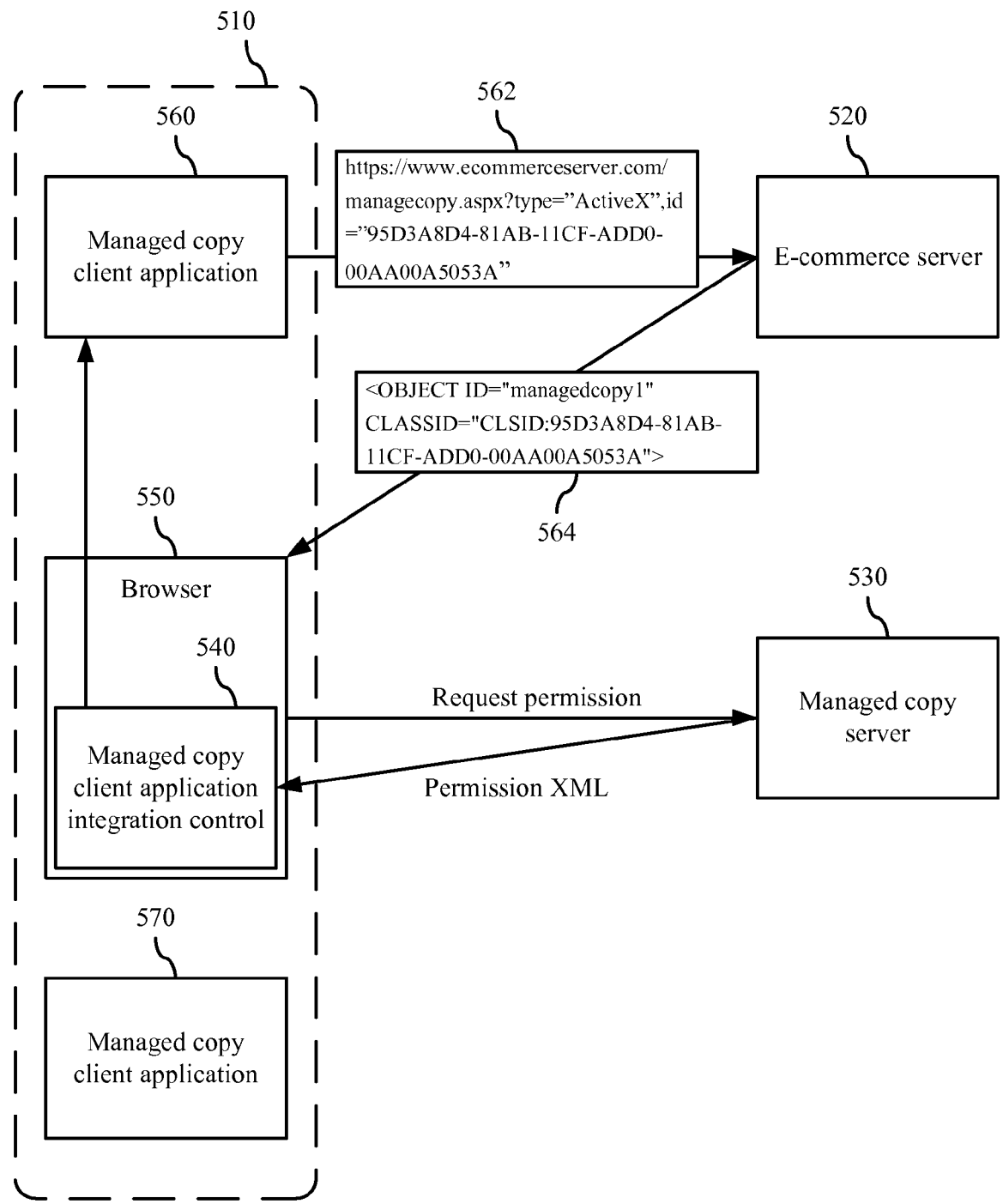
FIG. 6 is a block diagram showing a client device, an e-commerce server, a managed copy server and an example of information flow relating to a managed copy process in which managed copy client application integration control is implemented as an ActiveX control according to described embodiments.
Figure 7:
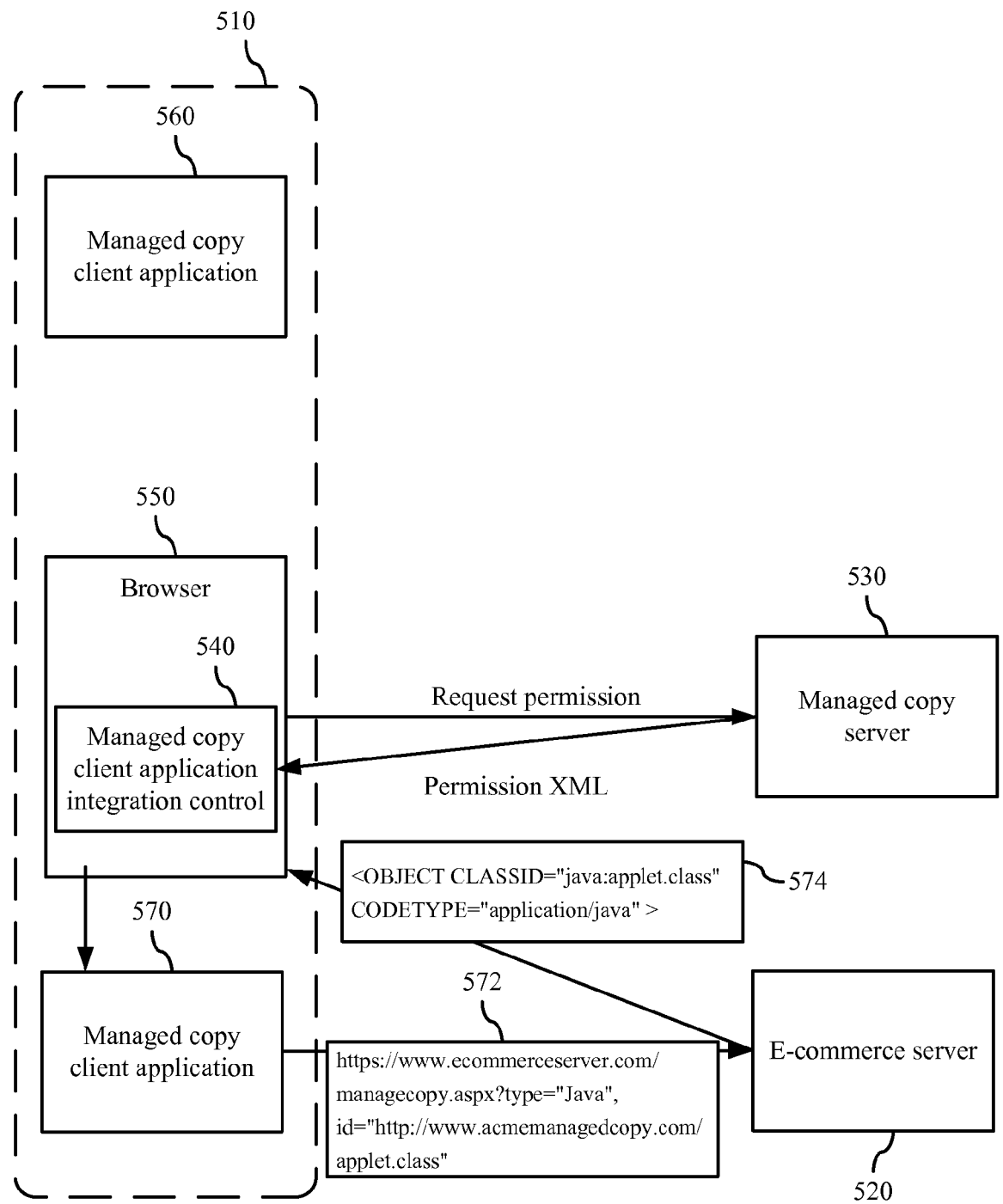
FIG. 7 is a block diagram showing a client device, an e-commerce server, a managed copy server and an example of information flow relating to a managed copy process in which managed copy client application integration control is implemented as a Java applet according to described embodiments.

Referring to FIGS. 6 and 7, the client device (510) has two managed copy client applications (560, 570), where one managed copy client application (560) is implemented as an ActiveX control and the other managed copy client application (570) is implemented as a Java applet. The ActiveX control and the Java applet each have a mechanism to provide an identifier for the control.

FIG. 6 is a diagram showing an example of information flow relating to a managed copy process in which managed copy client application integration control (540) is implemented as an ActiveX control. In the example shown in FIG. 6, a unique COM ClassID (a 32-bit GUID) can be used to register an ActiveX control in the registry used in a Microsoft Windows operating system. The managed copy client application (560) sends request data (562) to the e-commerce server. The request data (562) includes a URL for the e-commerce server, a type designation ("ActiveX") for the managed copy client application integration control (540) and a ClassID. In response, the e-commerce server adds an object element (564) to an HTML page sent by the e-commerce server (520) to the client device (510).

FIG. 7 is a diagram showing an example of information flow relating to a managed copy process in which managed copy client application integration control (540) is implemented as a Java applet. In the example shown in FIG. 7, a URL is used to identify an applet and disambiguate the applet from other applets available from a third-party vendor. The managed copy client application (570) sends request data (572) to the e-commerce server. The request data (572) includes a URL for the e-commerce server, a type designation ("Java") for the managed copy client application integration control (540) and a URL to an applet available from a third-party vendor ("http://www.acmemanagedcopy.com/applet-.class"). In response, the e-commerce server adds an object element (574) to an HTML page sent by the e-commerce server (520) to the client device (510).

The examples shown in FIGS. 6 and 7 use the "OBJECT" element to represent ActiveX controls, Java applets, and other objects. For more information on the OBJECT element, see World Wide Web Consortium (W3C), "HTML 4.01 Specification, W3C Recommendation" (December 1999).

Alternatively, the type of the control is implied from a string that identifies the control. For example, if the identifying string is a URL, the type (Java) could be implied if only Java applets are identified with a URL. Or, the managed copy client application integration control is selected or identified in some other way.

D. Alternatives

Alternatively, a managed copy transaction can occur using an arrangement that differs from the arrangements shown in FIGS. 5, 6 and 7. For example, although FIGS. 5, 6 and 7 shows a separate e-commerce server (520) and managed copy server (530), e-commerce functions and managed copy functions can be provided by the same server, or by more than two servers. As another alternative, fewer than two or more than two managed copy client applications may be present on the client device (510).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. A method comprising:
at a client device having a managed copy client application, generating, by the managed copy client application, managed copy request data comprising an identifier for an integration control installable on the client device, wherein the integration control includes a standardized interface comprising a callable integration control method to be called when a commercial transaction on a server has been completed;

transmitting, from the client device, the managed copy request data comprising the identifier for the integration control;

in response to the transmitting of the managed copy request data comprising the identifier for the integration control, receiving, at the client device, response data from the server, wherein the response data from the server comprises a reference to the integration control specified by the identifier for the integration control that was transmitted from the client device;

wherein the response data facilitates installation of the integration control on the client device; and wherein the integration control referenced by the response data from the server and specified by the identifier for the integration control that was transmitted from the client device provides the standardized interface to facilitate communication between the server and the managed copy client application in a heterogeneous environment comprising a plurality of integration controls of different integration control types supporting the standardized interface and in communication with the server, wherein the communication includes receiving, at the managed copy client application, authorization information that is passed when the callable integration control method to be called when the commercial transaction on the server has been completed is called and allows managed copy operations to take place.

2. The method of claim 1, wherein the integration control is of an ActiveX control type.

3. The method of claim 2, wherein the identifier for the integration control is a class ID.

4. The method of claim 1, wherein the integration control is of a Java applet type.

5. The method of claim 4, wherein the identifier for the integration control is a uniform resource locator.

6. The method of claim 1, wherein the request data further comprises a type indicator for the integration control.

7. The method of claim 1, wherein the server is an e-commerce server.

8. The method of claim 1, further comprising:
installing the integration control on the client device;
receiving managed copy information from the server via the integration control; and
making one or more managed copies of a digital media product based at least in part on the managed copy information received from the server via the integration control.

9. A method comprising:
receiving managed copy request data comprising an identifier for a managed copy client application integration control installable on a client device, wherein the integration control includes a callable integration control method to be called when a commercial transaction has been completed;
locating the managed copy client application integration control based at least in part on the identifier;
transmitting response data in response to the received managed copy request data;
wherein the response data facilitates installation of the managed copy client application integration control on the client device, and wherein the response data comprises an object element in a HyperText Markup Language page that comprises a reference to the managed copy client application integration control located at least in part on the received identifier for the managed copy client application integration control; and
wherein the managed copy client application integration control provides a standardized interface comprising the callable integration control method to facilitate communication between a server and a managed copy client application running on the client device in a heterogeneous environment comprising a plurality of application integration controls of different application integration control types supporting the standardized interface and in communication with the server, wherein the communication allows managed copy operations to take place and includes passing authorization information to the managed copy client application when the callable integration control method is called.

10. The method of claim 9, wherein the identifier comprises a uniform resource locator, and wherein the locating the managed copy client application integration control based at least in part on the identifier comprises looking up the managed copy client application integration control at a location specified by the uniform resource locator.

11. The method of claim 9, wherein the identifier comprises a class ID.

12. The method of claim 9, wherein the acts of claim 11 are performed at least in part by an e-commerce server.

13. The method of claim 9, wherein the HyperText Markup Language page comprises a script that calls a method of the managed copy client application integration control.

14. One or more computer-readable storage media, not consisting of a signal, having stored thereon computer-executable instructions for causing one or more computers to perform a method comprising:
at a client device having at least one managed copy client application, generating request data comprising an identifier for an integration control installable on the client device, wherein the integration control includes a standardized interface comprising a callable integration control method to be called when a commercial transaction on a server has been completed, wherein the client device operates in a heterogeneous environment comprising a plurality of integration controls of different integration control types supporting the standardized interface and in communication with the server;
transmitting, from the client device, the request data comprising the identifier for the integration control;
in response to the transmitting of the request data comprising the identifier for the integration control, receiving response data from the server, wherein the response data from the server comprises an object element in a HyperText Markup Language page that comprises a reference to the integration control specified by the identifier for the integration control that was transmitted from the client device;
wherein the response data facilitates installation of the integration control on the client device; and
wherein the integration control provides an interface that facilitates communication between the server and the at least one managed copy client application, wherein the communication includes receiving, at the managed copy client application, authorization information that is passed when the callable integration control method is called.

15. The computer-readable storage media of claim 14, wherein the integration control is of an ActiveX control type.

16. The computer-readable storage media of claim 14, wherein the integration control is of a Java applet type.

17. The computer-readable storage media of claim 14, wherein the method further comprises:
- by the at least one managed copy client application, receiving managed copy information from the server via the control; and
- making a managed copy based at least in part on the received managed copy information.

18. A method comprising:
- at a client device having a managed copy client application and a browser, generating, by the managed copy client application, managed copy request data for a HyperText Markup Language (HTML) page, the managed copy request data comprising an identifier for an integration control associated with the managed copy client application and installable on the client device, and an indication of a given integration control type out of a plurality of integration control types, wherein the integration control includes an integration control method to be called when a commercial transaction on a server has been completed;
- transmitting, from the client device, the managed copy request data comprising the identifier for the integration control, wherein the request data comprises a string corresponding to the integration control and an integration control type;
- wherein the integration control comprises an ActiveX control or a Java applet;
- in response to the transmitting of the managed copy request data comprising the identifier for the integration control, receiving, at the client device, response data from the server, wherein the response data from the server comprises an object element in the HTML page that comprises a reference to the integration control specified by the identifier for the integration control that was transmitted from the client device and defines a user interface that allows entry of information relevant to the transaction;
- wherein the response data facilitates installation of the integration control on the client device;
- installing the integration control on the client device;
- wherein the integration control provides a standardized interface to facilitate communication between the server and the managed copy client application in a heterogeneous environment comprising a plurality of integration controls of the different integration control types, the plurality of integration controls supporting the standardized interface and in communication with the server, wherein the communication includes receiving, at the managed copy client application, authorization information that is passed when the callable integration control method is called and allows managed copy operations to take place; and
- receiving managed copy information from the server via the integration control;
- wherein the managed copy information from the server comprises offers information that comprises a representation of Extensible Markup Language offers schema; and
- making one or more managed copies of a digital media product based at least in part on the managed copy information received from the server via the integration control.

* * * * *